United States Patent [19]
Koch et al.

[11] Patent Number: 5,620,505
[45] Date of Patent: Apr. 15, 1997

[54] FILTER

[75] Inventors: Volker Koch, Stuttgart; Helmut Luka, Kornwestheim; Nikolaus Moser, Ditzingen; Bruno Sommer, Ludwigsburg; Manfred Wagner, Stuttgart, all of Germany

[73] Assignee: Filterwerk Mann & Hummel GmbH, Ludwigsburg, Germany

[21] Appl. No.: 520,437

[22] Filed: Aug. 29, 1995

[30] Foreign Application Priority Data

Aug. 29, 1994 [DE] Germany .......................... 44 30 333.5

[51] Int. Cl.$^6$ .......................... B01D 29/07; B01D 53/04
[52] U.S. Cl. .................. 96/134; 96/138; 55/497; 55/499; 55/502; 55/509; 55/521; 210/493.3
[58] Field of Search .................. 55/490, 497, 499, 55/500, 502, 507, 509, 521; 96/134, 135, 138; 210/450, 493.1–493.5

[56] References Cited

U.S. PATENT DOCUMENTS

| | | | |
|---|---|---|---|
| 2,048,911 | 7/1936 | Zimmermann | 55/497 X |
| 2,966,960 | 1/1961 | Rochlin | 55/509 X |
| 3,397,518 | 8/1968 | Rogers | 55/502 X |
| 3,423,909 | 1/1969 | Bennett et al. | 55/502 X |
| 3,712,033 | 1/1973 | Gronholz | 55/502 X |
| 3,778,985 | 12/1973 | Daigle et al. | 55/502 X |
| 3,802,168 | 4/1974 | Deckas | 55/497 X |
| 3,869,392 | 3/1975 | Wolf | 55/521 X |
| 4,133,661 | 1/1979 | Strnad | 55/521 X |
| 4,714,486 | 12/1987 | Silverthorn | 96/134 |
| 4,961,764 | 10/1990 | Develle et al. | 55/316 |
| 5,013,438 | 5/1991 | Smith | 210/493.1 X |
| 5,022,901 | 6/1991 | Meunier | 96/134 |
| 5,062,874 | 11/1991 | Legare et al. | 96/134 X |
| 5,110,511 | 5/1992 | Hand | 55/497 X |
| 5,222,488 | 6/1993 | Forsgren | 55/497 X |
| 5,288,300 | 2/1994 | Mueller et al. | 55/497 |
| 5,368,622 | 11/1994 | McMillon | 55/497 |
| 5,376,270 | 12/1994 | Spearman | 55/497 X |
| 5,489,352 | 2/1996 | Spearman | 55/497 X |
| 5,501,794 | 3/1996 | Vande Graaf et al. | 55/497 X |
| 5,509,950 | 4/1996 | Vande Graaf et al. | 55/497 X |

FOREIGN PATENT DOCUMENTS

| | | | |
|---|---|---|---|
| 0581779 | 8/1959 | Canada | 55/502 |
| 0658529 | 2/1963 | Canada | 55/502 |
| 329544 | 8/1989 | European Pat. Off. | |
| 965012 | 5/1957 | Germany | |
| 2620148 | 12/1976 | Germany | 55/502 |
| 4133175 | 4/1993 | Germany | |
| 9116747 | 11/1993 | Germany | |
| 9209362 | 12/1993 | Germany | |
| 4323523 | 1/1995 | Germany | 55/502 |
| 2080141 | 2/1982 | United Kingdom | 55/490 |

*Primary Examiner*—Robert Spitzer
*Attorney, Agent, or Firm*—Evenson, McKeown, Edwards & Lenahan P.L.L.C.

[57] ABSTRACT

A filter having a filter element disposed in a filter housing; the filter element being formed of a pleated filter paper or a nonwoven filter material and being of substantially planar or flat configuration. Sealing elements in the form of a rolled seal are provided on at least two lateral surfaces of the filter in order to seal the filter element in the filter housing.

20 Claims, 5 Drawing Sheets

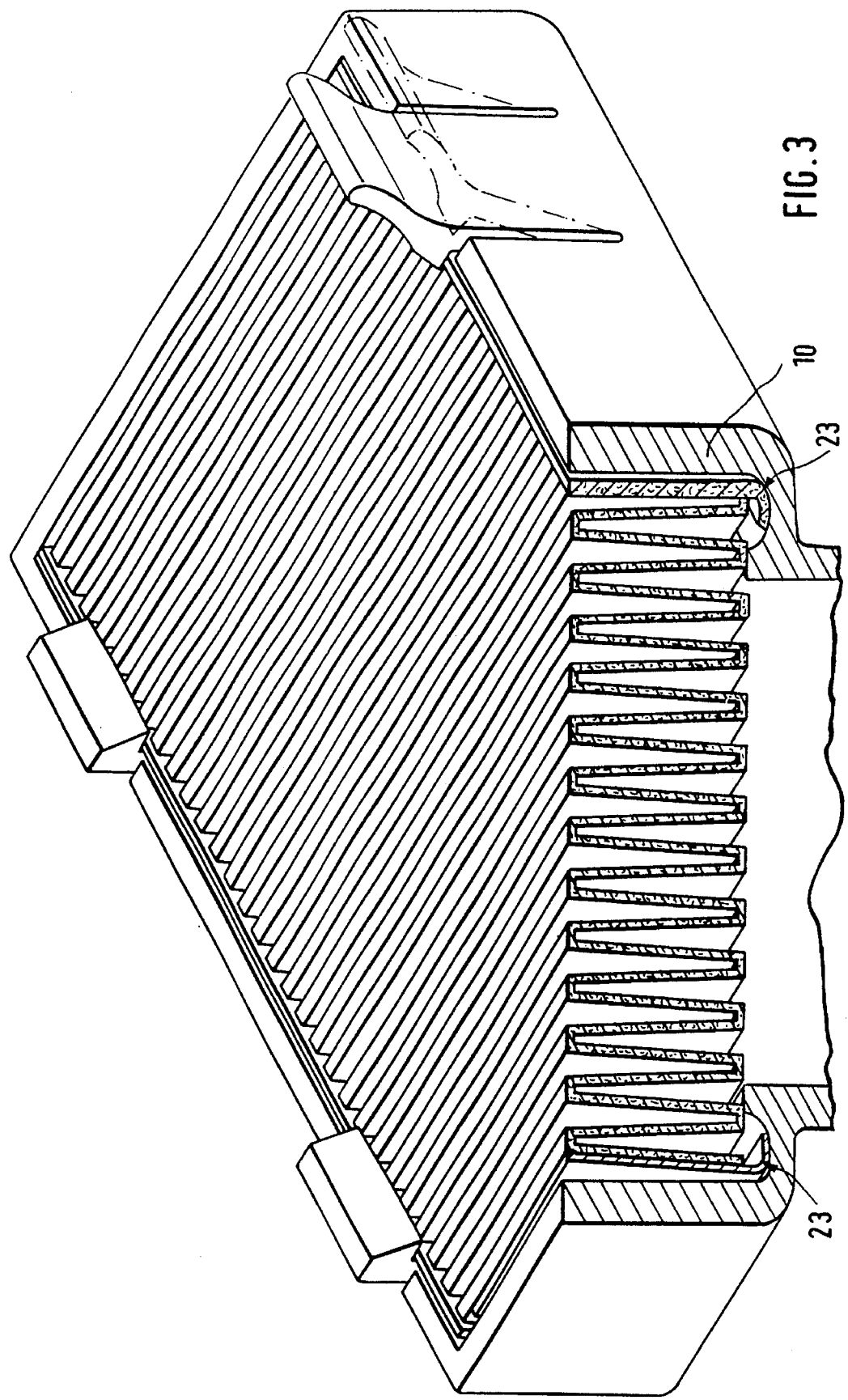

5,620,505

FILTER

BACKGROUND OF THE INVENTION

This invention relates to a filter comprising a substantially planar filter element formed of a pleated filter paper or nonwoven web disposed in a filter housing.

German Utility Model No. DE-U 92 09,362 discloses a filter device for filtering gases and/or liquids. This filter device consists of a filter element having a pleated filter medium, a holding frame into which the filter element can be inserted, and a base body into which the holding frame is inserted. The amount of waste material resulting from the replacement of the filter element is said to be reduced by the configuration of a holding frame.

A disadvantage of the known filter, however, is that the holding frame, as an additional component, increases the cost of such a filter. Moreover, the holding frame requires additional space which is lost from the filtration-active surface of the filter medium.

Additionally, German Utility Model No. DE-U 91 16,747 discloses a filter with a filter cartridge disposed in a filter housing. Here, again, the filter element is a pleated filter medium. The filter element is disposed in a frame. This frame is snapped into a holding frame.

Here too, a disadvantage is that a plurality of components is needed, which makes it expensive to manufacture such a filter.

SUMMARY OF THE INVENTION

The object of the present invention is to provide an effective filter which has a small number of components.

Another object of the invention is to provide a filter which is of simple construction and yet is reliably effective.

These and other objects of the invention are achieved by providing a filter comprising a filter element having a substantially planar configuration and comprising a pleated filter paper or a nonwoven web, the filter element being arranged in a filter housing and having a rolled-edge seal disposed on at least two lateral edges thereof, the rolled-edge seal sealing the filter element relative to the filter housing.

In accordance with a further preferred embodiment of the invention, the objects are also achieved by providing a filter comprising a filter element disposed in a filter housing, the filter element having a substantially planar configuration and comprising a pleated filter paper or a nonwoven web, the filter element further comprising a sealing strip provided on at least two lateral edges thereof, and the sealing strip in conjunction with a gasket member disposed in the housing sealing the filter element with respect to the filter housing.

The essential advantage of the invention is that no additional frame is needed for the filter element for the purpose of sealing this element in the housing.

The invention makes use of the property that portions of the filter element are suitable for use as gaskets to seal the filter element with respect to the housing. The gaskets which thus are components of the filter element, can advantageously De made from the same material from which the pleated, filtration-active medium is made. Thus the disposal of the replaceable element presents no problems. The seal for the filter element is in the form of a rolled gasket which consists essentially of a flat material which conforms to a curved surface of the filter housing.

In accordance with one embodiment of the invention, the sealing is accomplished at the longitudinal sides of the pleated filter element by a labyrinth gasket. This labyrinth gasket is disposed on the filter housing in the manner of a knife edge-like body. This knife body reaches into a fold of the pleated filter element. Additional sealing elements are then no longer needed on these sides.

According to a further embodiment of the invention, a sealing strip is provided on the lateral surfaces of the filter element. This sealing strip has two functions. On the one hand it provides for an effective sealing off of the lateral openings of the pleated filter element. On the other hand, the filter element forms a rolled gasket in the projecting area.

An additional embodiment of the invention is characterized by the fact that sealing is effected by the side-sealing strip in conjunction with a gasket disposed in the filter housing.

In accordance with still another advantageous embodiment of the invention, the filter element is combined with an active carbon filter. This active carbon filter can be placed after the filter element as a compact filter pad. A rolled gasket is also suitable for sealing both the active carbon filter and the filter element. This rolled gasket is disposed on the filter element and contains the active carbon filter pad.

According to further embodiments, the active carbon filter pad, due to its elasticity, can be inserted sealingly into the filter housing. For this purpose, the active carbon filter pad may have slightly larger dimensions than the cut-out that is provided.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to representative preferred embodiments illustrated in the accompanying drawings in which:

FIG. 3 is an illustration of yet another preferred embodiment of a filter according to the invention;

DETAILED DESCRIPTION OF PREFERRED EMBODIMENTS

Figure 1:
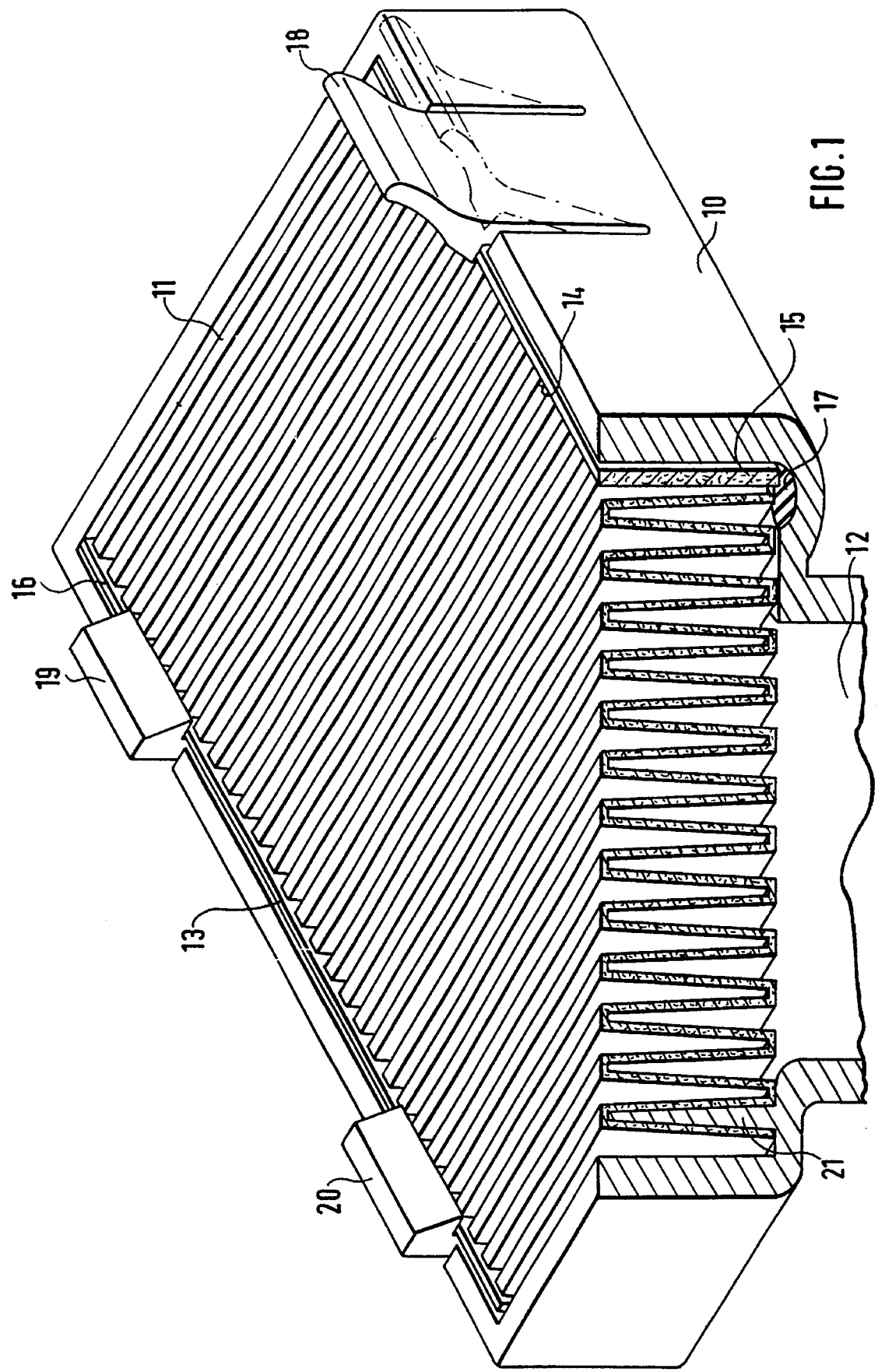
FIG. 1 is a perspective view of a filter according to the invention.

FIG. 1 shows a filter with a filter housing 10, which preferably is formed of plastic. In this filter housing 10 there is disposed a pleated filter insert 11 as the filtration element.

The air to be filtered flows downwardly against the filter insert 11 and leaves the filter through the clean-air outlet 12. The filter insert 11 has on its lateral surfaces 13 and 14 sealing strips 15 and 16, respectively. Each sealing strip may be formed, for example, of the same material as the filter insert and is adhesively bonded to the latter. The filter housing 10 is equipped with a gasket 17. The filter insert 11 is inserted downwardly into the filter housing 10, so that in its final position the sealing strip 15 rests on the gasket 17 and laterally seals the filter insert with respect to the housing. The filter insert is secured by means of snap tongues 18, 19 and 20 against falling out of the housing. The shorter side the filter housing at the front of the drawing is provided with a knife-edge mount 21. Another such knife-like mounting is situated at the opposite (rear) end of the filter housing. This knife-edge mount 21 is receivingly engaged in a pleat of the filter insert 11 and thus forms a labyrinth seal which results in reliable sealing on these short sides.

Figure 2:
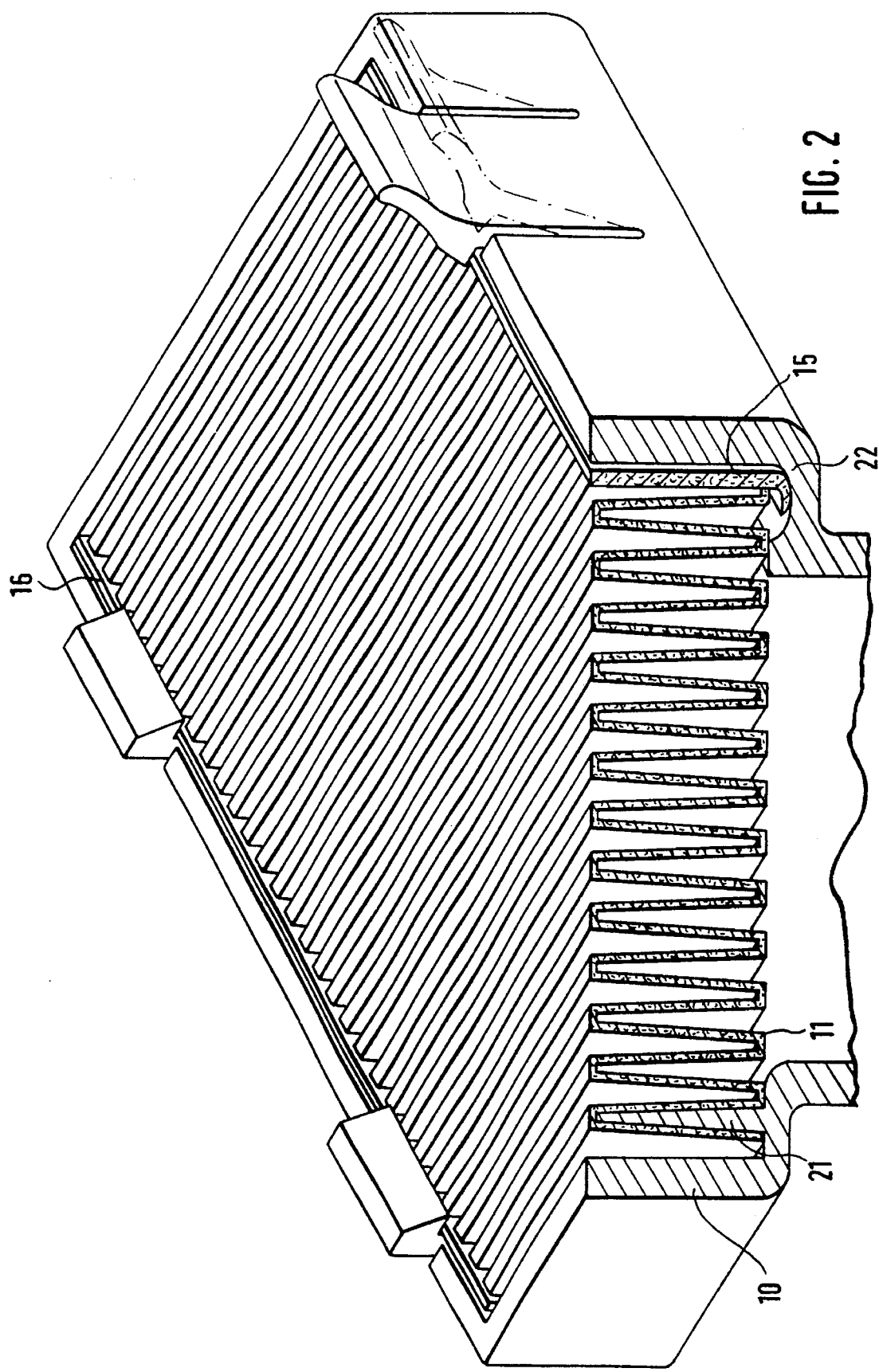
FIG. 2 is an illustration of another preferred embodiment of a filter according to the present invention.

FIG. 2 shows a variant of the filter depicted in FIG. 1. Here again a knife-edge mount 21 is provided on the filter housing 10. The gasket 17 of FIG. 1 is unnecessary in this embodiment and has been omitted. Instead, the bottom end of the sealing strips 15 and 16 is configured as a rolled gasket, i.e., it is slightly higher than the thickness of the filter insert 11. When the filter insert 11 is inserted to its final position, the sealing strip slips around the curved surface 22 of the filter housing. Due to the elasticity or resilience of the sealing strip 15, 16, an effective seal is achieved on these side surfaces.

Figure 2A:
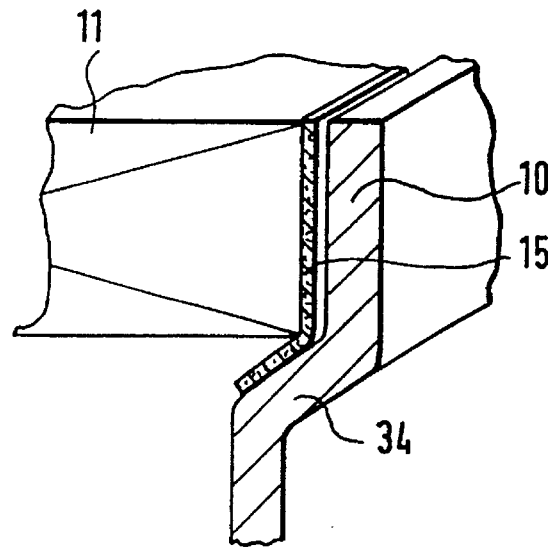
FIGS. 2a and 2b are sectional partial perspective views illustrating preferred embodiments with sealing tapes provided on lateral edges or surfaces of the filter element of the invention.

FIG. 2a illustrates another alternate preferred embodiment in which the projecting portion of the sealing strip 15 sealingly engages an inclined flat surface 34 on filter housing 10.

Figure 2B:
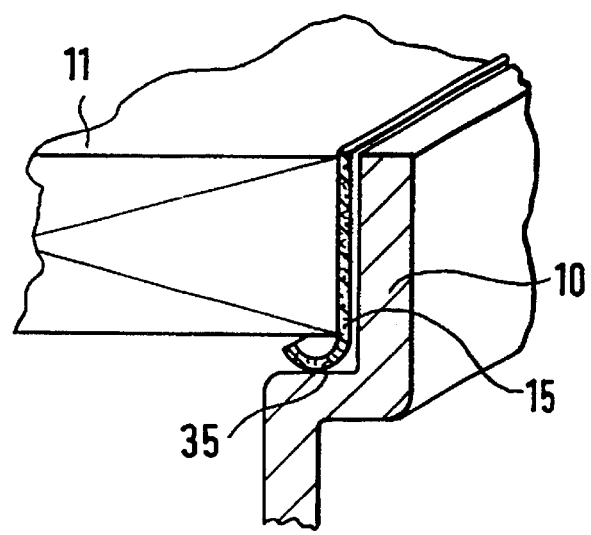

Similarly, FIG. 2b depicts a further preferred embodiment of the invention in which the projecting portion of the sealing strip 15 forms a rolled-edge seal which bears against a flat surface 35 formed on the filter housing 10.

FIG. 3 shows another variant of the filter of the invention. This embodiment is similar to the embodiment of FIG. 2 in that the rolled gasket lies against the curved surface 22 formed on the filter housing 10. However, instead of a knife-edge mount as shown in FIGS. 1 and 2, the shorter sides of the filter insert 11 are also equipped with rolled-edge sealing gaskets 23.

Figure 4:
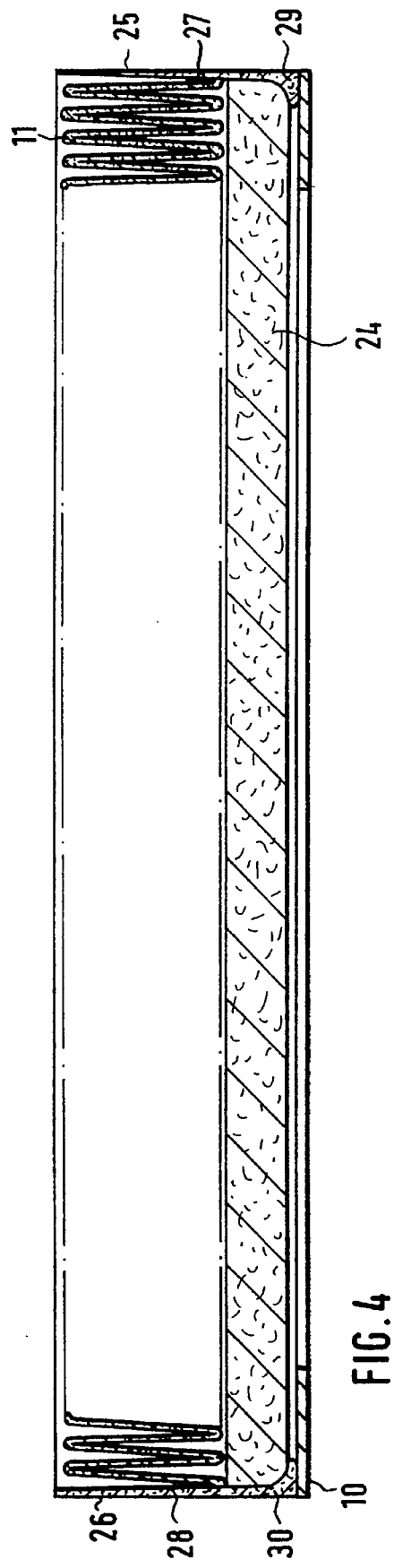
FIG. 4 is an illustration of a combination filter embodiment according to the invention.

FIG. 4 shows a schematic illustration of a combination filter according to the invention. A combination filter of this type is particularly useful for filtering air for the passenger compartment of a motor vehicle. Such a combination filter comprises a pleated filter insert 11 which is active as a particle filter. The filter insert 11 is followed by an active carbon filter 24. The active carbon filter serves to minimize the noise in the vehicle and to filter out harmful gases. It is arranged downstream of the filter insert 11 (i.e. following the filter insert in the direction of gas flow through the filter) in the form of a filter pad. The lateral surfaces 25 and 26 of the filter insert 11 are each provided with a sealing strip 27, 28. This sealing strip has at its bottom portion a rolled gasket 29, 30, at each end. The active carbon filter 24 is enclosed and gripped by the rolled gasket 29, 30, and thus it is secured to the filter insert 11. At the same time this rolled gasket seals the filter insert 11 with respect to the filter housing 10.

Figure 5:
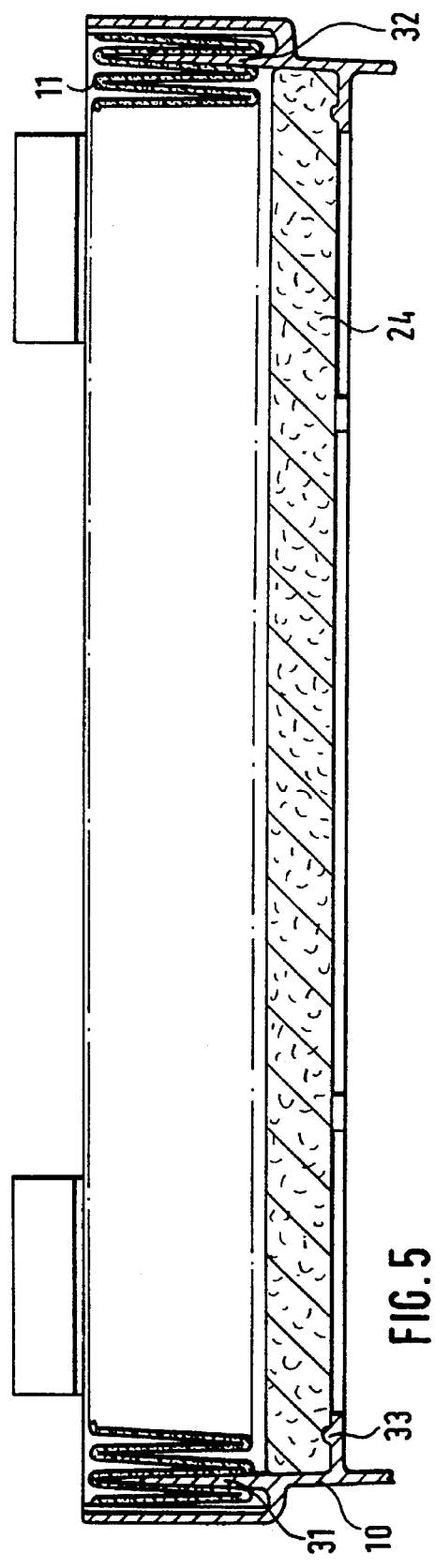
FIG. 5 is an illustration of a further preferred embodiment of a combination filter according to the invention.

FIG. 5 shows another way of securing the active carbon filter 24. This active carbon filter 24, as shown in this drawing, is secured in the housing 10 independently of the filter insert 11. The fastening advantageously is provided by making the active carbon-containing filter pad 24 slightly larger than the housing in which it is received so that the resilience of the active carbon filter pad 24 enables the filter to be gripped in the housing 10. The filter insert 11 is disposed sealingly in the filter housing 10 by means of knife-edge mounts 31 and 32. To improve the sealing action, a circumferential sealing bead 33 can be provided. Of course, the types of seals disclosed here can be combined in any desired manner. For example, the four sides of the filter insert can be configured with a rolled sealing edge. It is likewise possible to seal only two lateral surfaces with rolled sealing edges and two lateral surfaces with a knife-edge mounts.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filter comprising a filter element having a substantially planar configuration and comprising a pleated filter paper or a nonwoven web, said filter element being arranged in a filter housing and having a rolled-edge seal disposed on at least two lateral edges thereof, said rolled-edge seal engaging a portion of said filter housing which extends at least partially laterally inwardly from said lateral edges, sealing the filter element relative to the filter housing.

2. A filter according to claim 1, wherein said filter element comprises a pleated filter paper, and said housing is provided with a knife-edge mount which is receivingly engaged in a pleat of the pleated filter paper.

3. A filter according to claim 2, wherein the knife-edge mount forms a labyrinth seal with the filter element.

4. A filter according to claim 1, wherein a sealing strip is provided on the lateral edges of the filter element, said sealing strip being higher than the thickness of the filter element so that a portion of the sealing strip projects beyond a planar face of the filter element; said projecting portion of the sealing strip forming the rolled-edge seal.

5. A filter according to claim 4, wherein the laterally inwardly extending portion of the housing comprises a curved surface, and said projecting portion of the sealing strip extends along and conforms to said curved surface.

6. A filter according to claim 4, wherein the sealing strip and the filter element are made of an identical material.

7. A filter according to claim 4, wherein the sealing strip is adhesively bonded to the filter element.

8. A filter according to claim 1, further comprising an active carbon filter in the form of a pad arranged in series with the filter element.

9. A filter according to claim 8, wherein the filter pad is encompassed by the rolled-edge seal.

10. A filter according to claim 8, wherein the active carbon pad is slightly larger than the filter housing and is compressed upon insertion into the filter housing such that the active carbon pad forms a seal with the housing.

11. A filter according to claim 1, wherein the laterally inwardly extending portion of the housing comprises a curved surface, and said rolled-edge seal conforms to said curved surface.

12. A filter comprising a filter element disposed in a filter housing, said filter element having a substantially planar configuration and comprising a pleated filter paper or a nonwoven web, said filter element further comprising a sealing strip provided on at least two lateral edges of the filter element, and said sealing strip in conjunction with a gasket member disposed in the housing sealing the filter element with respect to the filter housing.

13. A filter comprising a filter element disposed in a filter housing, said filter element having a substantially planar configuration and comprising a pleated filter paper or a nonwoven web, said filter element further comprising a sealing strip provided on at least one lateral edge of the filter element, said sealing strip comprising a resilient material and having essentially flat sides, said sealing strip having a projecting portion which projects beyond a planar face of the filter element, said filter housing having a first surface corresponding to said at least one lateral edge and a sealing surface extending at least partially laterally inwardly from said at least one lateral edge, wherein one of said flat sides of said projecting portion of the sealing strip engages with and conforms to said sealing surface of the filter housing to seal the filter element relative to the filter housing.

14. A filter according to claim 13, wherein said sealing surface comprises a curved surface which extends away from said planar face of the filter element.

15. A filter according to claim 13, wherein said sealing surface comprises an inclined flat surface which extends at an oblique angle away from said planar face of the filter element.

16. A filter according to claim 13, wherein said sealing surface comprises a flat surface which extends generally perpendicularly to said first surface.

17. A filter according to claim 13, wherein the sealing strip and the filter element are made of an identical material.

18. A filter according to claim 13, wherein the sealing strip is adhesively bonded to the filter element.

19. A filter according to claim 13, wherein said filter element comprises a pleated filter paper, and said housing is provided with at least one knife-edge mount which is receivingly engaged in a pleat of the pleated filter paper.

20. A filter according to claim 19, wherein said filter element has two longitudinal lateral edges which are parallel to the pleats of said pleated filter paper and has two perpendicular lateral edges which are perpendicular to the pleats of said pleated filter paper, wherein one of said knife-edge mounts is arranged at each of said longitudinal edges, and wherein one of said sealing strips is arranged at each of said perpendicular lateral edges.

* * * * *